June 20, 1961 D. J. BORODIN 2,989,006
WORK TRANSFER DEVICE
Filed Feb. 17, 1959 5 Sheets-Sheet 1
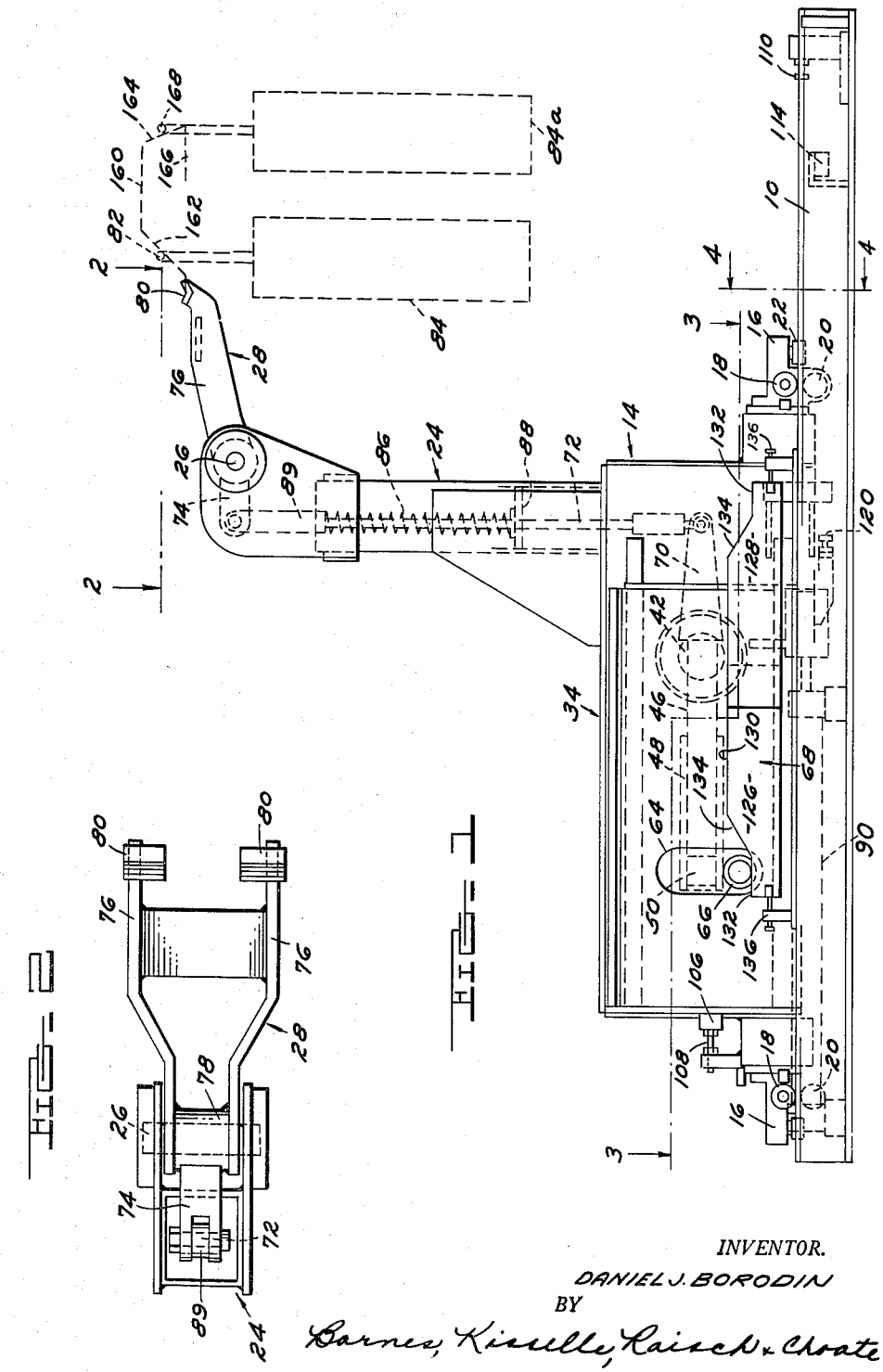
INVENTOR.
DANIEL J. BORODIN
BY
Barnes, Kisselle, Raisch & Choate
ATTORNEYS

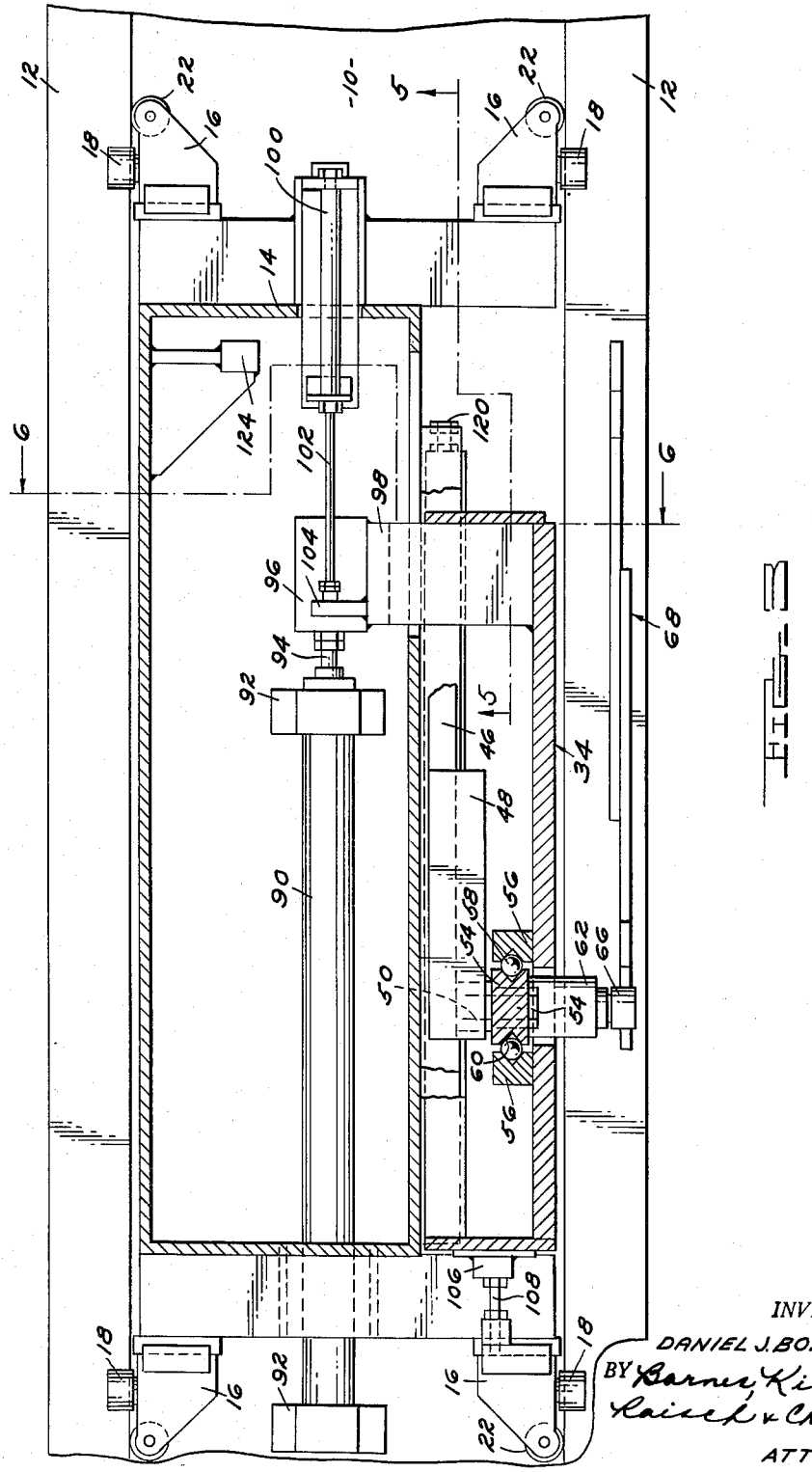

June 20, 1961 D. J. BORODIN 2,989,006
WORK TRANSFER DEVICE
Filed Feb. 17, 1959 5 Sheets-Sheet 3
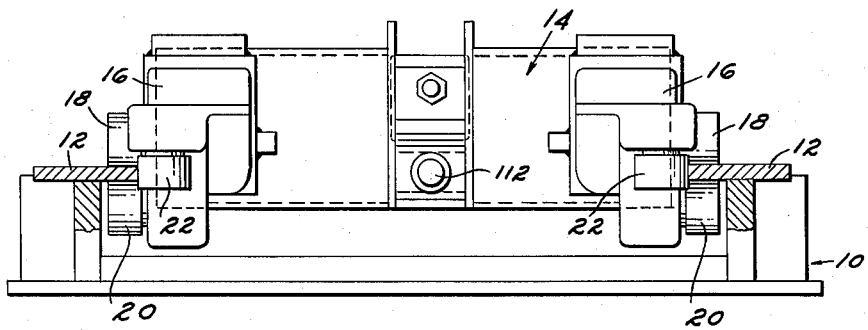
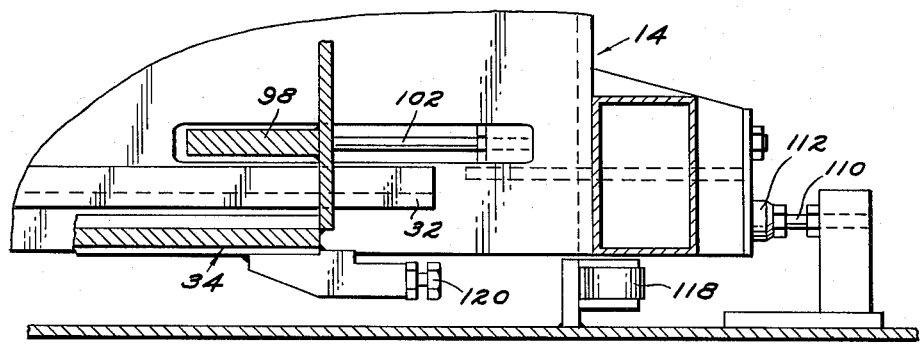
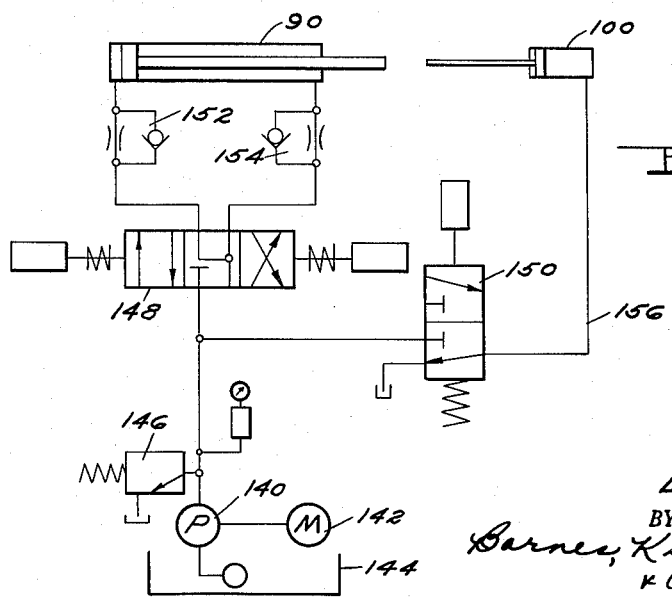
INVENTOR.
DANIEL J. BORODIN
BY
Barnes, Kisselle, Raisch
& Choate
ATTORNEYS

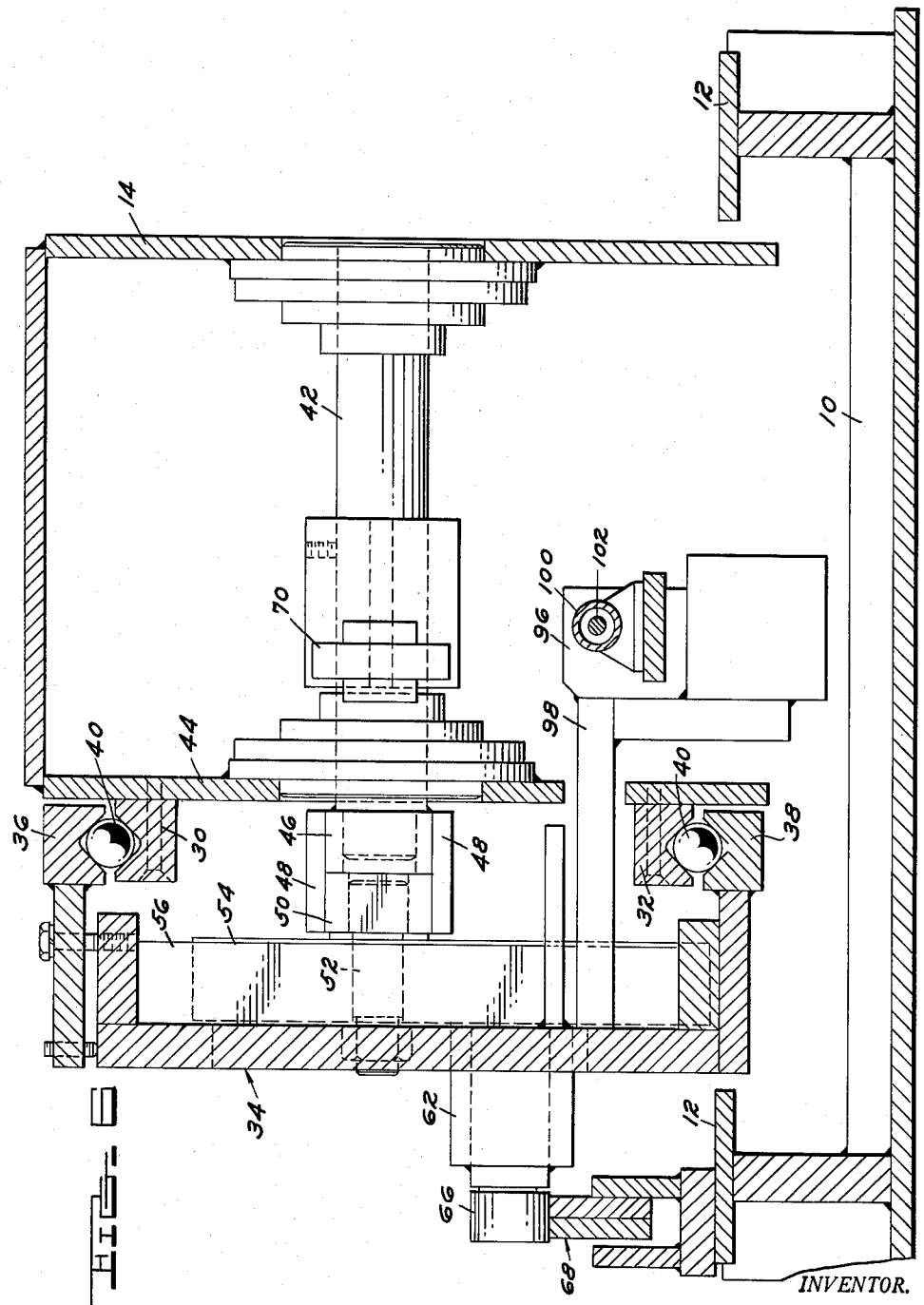

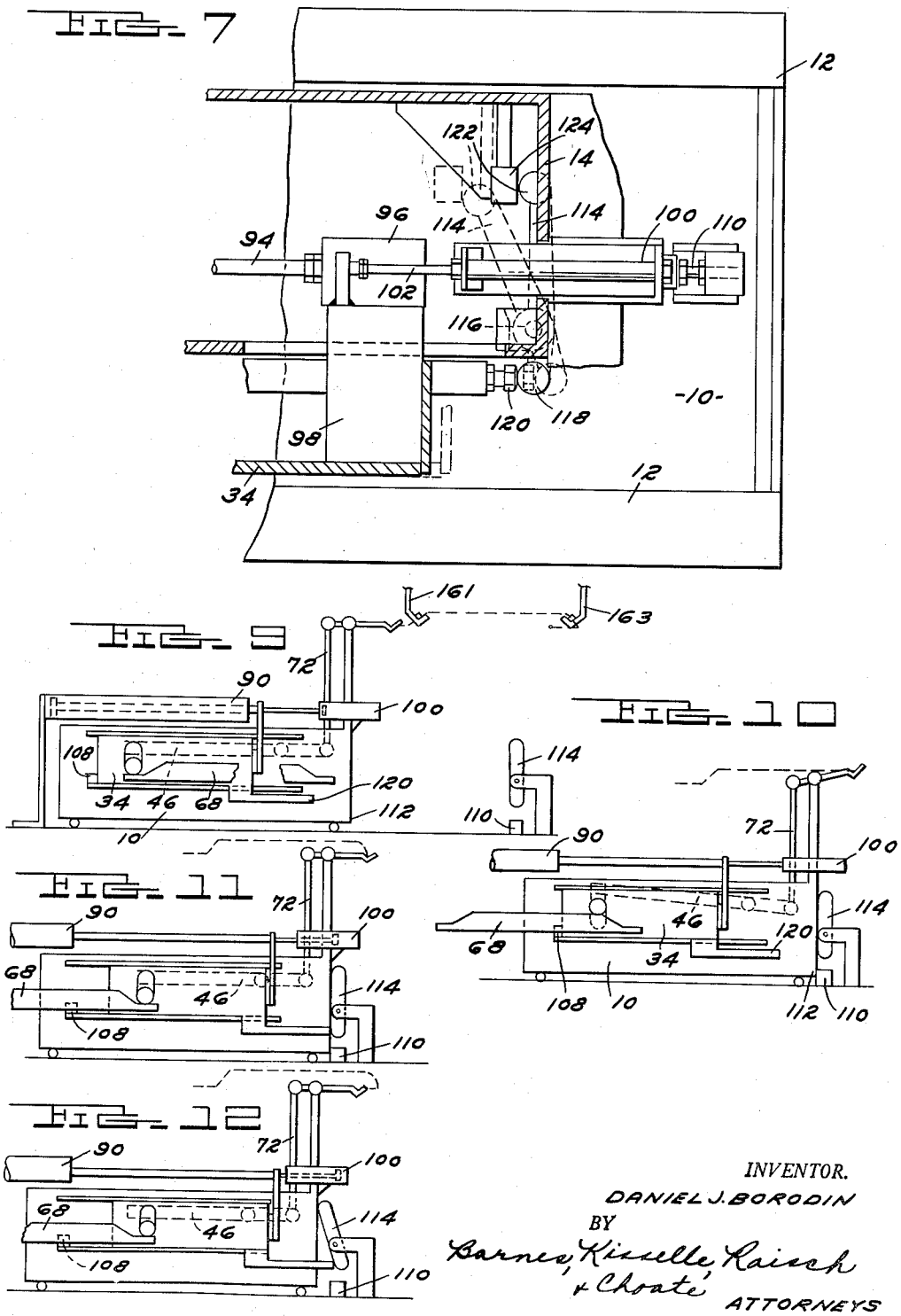

United States Patent Office 2,989,006
Patented June 20, 1961

2,989,006
WORK TRANSFER DEVICE
Daniel J. Borodin, Detroit, Mich., assignor to Allied Research Products Incorporated, Baltimore, Md., a corporation of Maryland
Filed Feb. 17, 1959, Ser. No. 793,740
19 Claims. (Cl. 104—96)

This invention relates to a work transfer device and more particularly to a mechanism for transferring work pieces from one conveyor to another.

The device of this invention is particularly adapted for loading and unloading automatic plating machines. In plating machines of the automatic type, the work pieces are usually arranged on racks and the racks are caused to travel in an endless path through a series of tanks containing various solutions for treating the work pieces. Usually, the racks are moved with an intermittent motion; and at one point in their travel, there is located a loading and unloading station at which the racks containing the unplated parts are loaded into the machine and the racks containing the plated parts are removed from the machine. It is not uncommon in such arrangements to provide a work rack conveyor alongside the unloading station in the machine. Such conveyor also operates intermittently with the conveying means of the plating machine and racks containing the unplated parts are transferred from the conveyor to the machine at the loading station and the racks containing the plated parts are transferred from the machine back to the conveyor.

Plating machine loaders for accomplishing this operation are currently in use; but such loaders, insofar as I am familiar, are rather cumbersome and require considerable clearance between the successive racks at the loading and unloading station because such loaders, in operation, have portions which extend into the spaces between successive racks. As a matter of fact, the clearance required at the loading and unloading station for loaders of conventional design is usually in excess of that required between racks in the processing portion of the plating machine. Such clearance is not only wasteful of space, but in some cases, requires relatively expensive mechanisms for maintaining the racks at the loading and unloading station at a greater spacing than in the processing portions of the plating machine.

It is an object of the present invention to provide a work loader generally of the type described but which is so designed as to require a minimum of clearance between successive racks at the loading and unloading station of the plating machine.

A further object of the present invention is to provide a work loading device of the type generally described which is movable back and forth on a base from a work conveyor to the loading station of the plating machine to transfer a work rack from the conveyor to the machine and while the loading device is at the loading station on the machine, the conveying mechanism of the machine is permitted to advance one rack so that on the retraction stroke of the work loader of this invention, a rack loaded with plated parts is transferred from the machine back to the conveyor.

In the drawings:
FIG. 1 is a side elevational view of a work loader according to the present invention.
FIG. 2 is a fragmentary top view of the lift arm assembly of the machine as viewed along the line 2—2 in FIG. 1.
FIG. 3 is a sectional view along the line 3—3 in FIG. 1.
FIG. 4 is a sectional view along the line 4—4 in FIG. 1.
FIG. 5 is a sectional view along the line 5—5 in FIG. 3.
FIG. 6 is a sectional view along the line 6—6 in FIG. 3.
FIG. 7 is a horizontal sectional view of the front portion of the machine with the carriage in the fully advanced position.
FIG. 8 shows the hydraulic circuit of the machine diagrammatically.
FIGS. 9, 10, 11 and 12 show in a diagrammatic way the manner in which the loader of this invention operates through one complete stroke of the carriage.

Referring first to FIGS. 1 and 3, the loader of the present invention generally comprises a base 10 which includes a pair of spaced apart horizontally extending tracks 12 on which a carriage 14 is mounted for rectilinear movement. Tracks 12 are generally T-shaped in section (FIG. 4). Carriage 14 is generally rectangular in shape and is provided with four brackets 16 at the corners thereof on which are journalled rollers 18 and 20 which engage the top and bottom faces of tracks 12 and rollers 22 which engage the opposed inner edge faces of track 12. These rollers guide the movement of carriage 14 back and forth on base 10. On the front end of carriage 14, there is mounted an upright column structure 24 on which is pivotally supported as at 26 a lift arm assembly 28.

Referring now to FIGS. 3 and 6, at one side face thereof, carriage 14 supports a pair of horizontally disposed and longitudinally extending ball ways 30 and 32. The groove of the upper ball way 30 faces upwardly and the groove of the lower ball way 32 faces downwardly. A horizontal slide assembly 34 is likewise provided with upper and lower opposed ball ways 36 and 38 which are juxtaposed to the ball ways 30 and 32 and are supported thereon for horizontal sliding movement of slide 34 by means of balls 40 between the juxtaposed ways.

Within the housing formed by the carriage 14, there is journalled a transversely extending shaft 42. One end of shaft 42 projects through the wall 44 of carriage 14 and has a crank arm 46 fixed thereon. Arm 46 extends rearwardly from the end of shaft 42 in a generally horizontal position. The rear portion of arm 46 is fashioned with a pair of laterally outwardly extending guide plates 48 along the upper and lower longitudinal edges thereof. Between these guide plates, there is arranged a bronze bearing block 50 journalled on a screw 52 which mounts the bearing block 50 on a vertical slide 54. Slide 54 is guided for vertical sliding movement on the horizontal slide 34 by means of ways 56 on horizontal slide 34 and balls 58 which engage ways 60 formed on the opposite vertical edges of vertical slide 54. A bushing 62 fixed on vertical slide 54 projects through a vertically elongated opening 64 in horizontal slide 34 (FIG. 1) and has a roller 66 journalled at the free end thereof. Roller 66 comprises a cam follower that is disposed to ride on a cam track 68.

Within carriage 14, there is fixed on shaft 42 a crank 70, the free end of which connects with the lower end of a link 72 extending vertically upwardly in column 24. The upper end of link 72 connects with a crank arm 74 of lift arm assembly 28. Lift arm assembly 28 is in the form of a weldment or a casting fashioned as a yoke having spaced arms 76 extending from a bushing 78 which forms the pivot 26. At their free ends, arms 76 are provided with small angles 80 which are shaped to engage with and pick up the support bar 82 at the upper end of a conventional plating rack 84. A spring 86 surrounds a portion of link 72 within column 24 with its lower end seated against a fixed bracket 88 in the column and its upper end bearing against an enlarged threaded portion 89 of link 72 (FIG. 1). The link 72 in threadedly adjustable to vary its length and thereby vary the vertical disposition of the lift angles 80 at the outer ends of the arms 76.

Referring now to FIG. 3, there is illustrated a main cylinder 90 which is fixedly mounted on the base 10 by brackets 92. Within cylinder 90, there is a piston, not illustrated, which connects with a piston rod 94, the outer end of which is in turn connected to a bracket 96 that is fixedly mounted on slide 34 by means of a laterally extending plate 98. Relative movement between carriage 14 and slide 34 is normally prevented by the action of a second cylinder 100 which is fixedly mounted at the front end of carriage 14 as is clearly shown in FIG. 3. Cylinder 100 has a smaller diameter than cylinder 90 and its piston rod 102 connects with a vertical plate 104 on the slide bracket 96. The pressure of hydraulic fluid in cylinder 100 normally biases slide 34 in a rearward direction on carriage 14 to a position wherein a bumper 106 at the rear end of slide 34 engages with a positive stop 108 on carriage 14. Stop 108 is adjustable in a longitudinal direction to vary the rearwardmost position assumed by slide 34 under the influence of cylinder 100. The extent of forward travel of carriage 14 on base 10 is determined by an adjustable positive stop 110 on base 10 which is engaged by a bumper 112 at the front end of carriage 14 (see FIG. 5).

The arrangement of the cylinders 90 and 100 normally cause the slide 34 to move as a unit with the carriage 14. It will be observed, however, that since cylinder 90 has a greater diameter than cylinder 100 and assuming that the unit pressure of the fluid in both of these cylinders is substantially the same, cylinder 90 can overcome the bias of cylinder 100 when the bumper 112 on the carriage engages the positive stop 110 on the base to cause the slide 34 to move forwardly relative to the carriage. Alternatively, it is likewise possible to move the carriage rearwardly while the slide 34 is moving in a forward direction. The means for accomplishing this latter movement, which is one of the important features of the present device, is illustrated in FIGS. 5 and 7. This is accomplished by a lever 114 mounted on a vertical axis on base 10 as at 116 (FIG. 7). The short lever arm of lever 114 has a rounded end or a roller 118 at its free end which is arranged and positioned to be engaged by an adjustable stop 120 on the underside of slide 34. The longer lever arm of lever 114 has a bearing portion 122 at the end thereof arranged to engage a fixed abutment 124 on carriage 14.

Cam track 68 comprises multiple sections, one of which is designated 126 and the other 128. Each of these cam tracks has a raised horizontally extending portion 130 which connects with a lower horizontally extending portion 132 by means of an inclined portion 134. The portions 130, 132 and 134 comprise cam surfaces along which the roller 66 is caused to roll. The various sections of the cam track 68 are adjustable longitudinally relative to each other by means of the screw adjustments shown at 136. These screw adjustments 136 permit variation in the timing of the pivotal movement of the lift arm assembly 28. If desired, the horizontally extending portions 132 of the track sections can be formed as separate track sections.

In the hydraulic circuit illustrated in FIG. 8, a hydraulic pump 140 driven by a motor 142 supplies hydraulic fluid under pressure from a sump 144 through a relief valve 146 to a solenoid operated four-way valve 148 and a solenoid operated dumping valve 150. The two outlet ports of four-way valve 148 are connected to opposite ends of cylinder 90 through directional and flow control valves 152, 154. The head end of cylinder 100 is connected to either the pressure port or the exhaust port of dumping valve 150, depending on the position of valve 150, by means of a conduit 156.

In operation, assuming that the carriage 14 is in the fully retracted position illustrated in FIG. 1, the lift arm assembly 28 is then disposed as shown in solid lines in FIG. 1. The rack 84 is shown in FIG. 1 in the position it assumes as it is suspended from a conveyor, not illustrated, from which racks loaded with unplated parts are to be transferred to the plating machine. The position of the rack 84 when loaded into the machine is illustrated diagrammatically at 84a in FIG. 1, keeping in mind that the stroke of the device as represented by the broken line showing at 160 has been foreshortened. When four-way valve 148 is actuated to admit pressure fluid to the head end of cylinder 90 through valve 152, carriage 14 together with slide 34 moves forwardly along base 10.

As soon as roller 66 encounters the inclined portion 134 of cam track section 136, the roller shifts upwardly, thus causing link 72 to shift downwardly and pivoting lift arm assembly 28 upwardly so that the lift angles 80 at the end of the lift arms 76 travel along a path designated by the broken line 162. During this initial movement of the lift arm assembly 28, it will be observed that the rack 84 is lifted up off the hook 161 (FIG. 9) of the conveyor that is positioned alongside the plating machine and moved slightly in a direction toward the plating machine.

Thereafter, as the carriage 14 moves forwardly along the base 10, cam follower 66 rides along the horizontal portions 130 of the two cam track sections 126, 128 until the roller reaches the declining portion 134 of section 128. The position of the various components of the loader in the fully retracted position is shown diagrammatically in FIG. 9; and in FIG. 10, these components are illustrated in the position they assume just before the roller 66 engages the declining portion 134 of track section 128.

The longitudinal adjustment of track section 128 is related to the positive stop 110 at the front end of base 10 such that as the bumper 112 on the carriage engages stop 110, roller 66 encounters the declining portion 134 of track section 128. The forward movement of the carriage is thus arrested, but slide 34 continues to move forwardly away from stop 108 at the rear of the carriage. At this point, dumping valve 150 is automatically actuated to connect cylinder 100 to sump 144. It should be noted that valve 150 could be replaced by a relief valve adjustable to connect cylinder 100 to sump 144 at a predetermined pressure. As slide 34 moves forwardly, roller 66 travels downwardly along the declining portion 134 of track section 128; and although the column assembly 24 remains stationary, the lift arm assembly 28 pivots downwardly about the axis 26 so that the angles 80 at the end of the arms 76 describe an arc designated by the broken lines 164 in FIG. 1. The rack is thus deposited on the hook 163 of the machine conveyor mechanism. The disposition of the various components at this portion of the stroke of the carriage is illustrated diagrammatically in FIG. 11.

The adjustment of stop 120 on slide 34 is adjusted so that as the roller 66 reaches the lower horizontal portion 132 of track section 128, stop 120 engages roller 118 at one end of lever 114. Continued forward movement of slide 34 thus causes lever 114 to pivot counterclockwise as viewed in FIG. 7; and since the opposite end of lever 114 at 122 is at this time in engagement with the abutment 124 on carriage 14, the carriage is retracted from the positive stop 110. The relative positions of the various components of the loader during this portion of the stroke are shown diagrammatically in FIG. 12. During this portion of the stroke, the angles 80 at the ends of arms 76 are retracted horizontally along the path designated by the broken lines 166 in FIG. 1.

Thus, it will be observed that when the angles 80 swing downwardly through the arc 164, they deposit the support arm 82 of the rack on the conveyor mechanism of the plating machine at the position indicated in FIG. 1 at 168. The arms continue to swing downwardly and then retract to a position out of the way where the lift arm assembly 28 clears the rack and permits the conveying mechanism of the plating machine to move a rack containing plated parts into the unloading position of the machine where the rack containing the unplated parts were previously deposited. Thereafter, valve 148 is actuated to admit oil under pressure to the rod end of cylinder 90 and allow the oil in the head end of the cylinder to exhaust through the flow control valve 152. Dumping valve 150 is simultaneously and automatically actuated to connect cylinder 100 to the pump. The slide 34 is thus retracted and lever 114 thus returns to the full line position illustrated in FIG. 7 (illustrated diagrammatically in FIG. 11). The pressure in cylinder 100 causes the carriage 14 to advance slightly to a position wherein the bumper 112 at the front end of the carriage engages the positive stop 110 on base 10. At this point of the return stroke, piston rod 102 is still partially retracted in cylinder 100 so continued movement of roller 66 up the incline 134 of track section 128 merely produces an upward pivoting movement of lift arm assembly 28 along the arc designated by the broken line at 164 in FIG. 1. As the angles 80 swing upwardly, they pick up the work loaded rack from the machine; and thereafter, when piston rod 102 is fully extended (that is, when stop 108 is engaged by bumper 106), the whole assembly of carriage 14 and slide 34 retracts along the base as a unit. As the cam roller 66 rolls down the declining portion 134 of track section 126, the rack loaded with the fully plated parts is deposited on the conveyor mechanism alongside the machine and the whole assembly retracts to a position out of the way to permit the conveyor assembly to index forwardly the distance between successive racks on the conveyor.

Cylinder 100 serves as a means for preloading the carriage. It serves as a spring; and while the use of a hydraulic cylinder is preferred from the operational standpoint, a preload spring could be employed, if desired. It should also be noted that in practice, to obtain smooth operation at a relatively high speed, decelerating valves would be employed to decrease the rate of oil flow to cylinder 100 at the opposite ends of its stroke. Use of such valves is conventional, and they are therefore not illustrated.

I claim:

1. Apparatus for transferring a work rack from one hooked supporting device to another comprising a base, track means on said base, a carriage guided for reciprocation on said base by said track means, drive means for said carriage, means for limiting movement of the carriage in one direction on said base to a predetermined position, a slide member mounted on the carriage for movement thereon in a direction generally parallel to the stroke of the carriage, a cam track on the base extending generally parallel to said track means, a cam follower on the slide member engaging said cam track and movable on the slide member in response to movement of the slide member relative to the cam track, a lift arm assembly mounted on the carriage for movement therewith and operatively connected with the cam follower so as to be actuated thereby, said lift arm assembly, when actuated, being adapted to engage a work rack on the hooked supporting device, means for reciprocating the slide member through a stroke in said one direction greater than the stroke of the carriage, means yieldably interconnecting the carriage to move with the slide member when the slide member is reciprocated whereby the lift arm assembly moves with said carriage and is capable of being actuated by relative movement between the cam follower and the cam track after the carriage reaches the end of its stroke in said one direction.

2. The combination set forth in claim 1 including means responsive to movement of the slide member beyond a predetermined position in said one direction for retracting the carriage from said predetermined limited position whereby the lift arm assembly is bodily retracted with the carriage and simultaneously actuated by movement of the slide member beyond said predetermined limited position.

3. Apparatus for transferring a work rack from one hooked supporting device to another comprising a base, a carriage reciprocably mounted on the base, means on the base for guiding the reciprocating movement of the carriage, means for limiting the stroke of the carriage in one direction to a predetermined position, a slide member mounted on the carriage for movement relative to the carriage and in a path generally parallel to the path of travel of the carriage, means for reciprocating the slide member, means yieldably interconnecting the carriage and slide member to move in unison, means for continuing the movement of the slide member in said one direction after the carriage reaches said one end of its stroke, a lift arm assembly mounted on the carriage for bodily movement therewith, said lift arm assembly being actuatable to engage a work rack suspended from said one hooked supporting device, transfer it, and deposit it on the other hooked supporting device, means for actuating said lift arm assembly comprising a cam track on the base extending generally parallel to the path of travel of the slide member and generally coextensive therewith and a cam follower on said slide member operably connected with the lift arm assembly and engageable with the cam track, said cam track having an operative portion for actuating the cam follower during at least that portion of the stroke of the slide member beyond said limited position of the carriage, whereby said lift arm assembly is actuated while the carriage remains in said fixed position at said end of its stroke.

4. The combination set forth in claim 3 wherein said lift arm assembly is pivotally supported on the carriage for pivotal movement about a horizontal axis and is actuated by said cam follower to pivot downwardly about said axis as the slide member moves in said one direction beyond said limited position of the carriage.

5. The combination set forth in claim 3 including means operative in response to movement of the slide member beyond said limited predetermined position of the carriage for retracting the carriage from said predetermined limited position.

6. The combination set forth in claim 3 including means operative when the slide reaches a predetermined position in its stroke and beyond said predetermined limited position of the carriage for retracting the carriage in response to continued movement of the slide in said one direction.

7. The combination set forth in claim 3 wherein said lift arm assembly is pivoted on said carriage about a horizontal axis extending transversely of the path of travel of the carriage and is located adjacent the front end of the carriage.

8. Apparatus for transferring a work rack from one hooked supporting device to another comprising a base, a carriage reciprocably mounted on the base, means on the base for guiding the reciprocating movement of the carriage, means for limiting the stroke of the carriage in one direction to a predetermined position, a slide member mounted on the carriage for movement relative to the carriage and in a path generally parallel to the path of travel of the carriage, means for reciprocating the slide member, means yieldably interconnecting the carriage and slide member to move in unison, means for continuing the movement of the slide member in said one direction after the carriage reaches said one end of its stroke, a lift arm assembly mounted on the carriage for bodily movement therewith, said lift arm assembly being actuatable to engage a work rack suspended from said one hooked supporting device, transfer it, and deposit it on the other hooked supporting device, means for actuating said lift arm assembly comprising a cam track on the base extending generally parallel to the path of travel of the slide member and generally coextensive therewith and a cam follower on said slide member operably connected with the lift arm assembly and engageable with the cam track, said cam track having operative portions for causing the lift arm assembly to pick up a work rack from one hooked supporting device and deposit it on the other hooked supporting device adjacent the opposite ends of the stroke of the carriage and means responsive to continued movement of the slide member beyond the predetermined limited movement of the carriage for retracting the carriage after the lift arm assembly has deposited the work rack on said other hooked supporting device.

9. Apparatus for transferring a work rack from one hooked supporting device to another comprising a base, a carriage on the base, a lift arm assembly mounted on the carriage for bodily movement therewith, said carriage being mounted on the base for reciprocation between a fixed advanced position and a retracted position and means for actuating said lift arm assembly when the carriage is reciprocated from one of said positions to the other for picking up a work rack from one of the hooked supporting devices and depositing it on the other, said last mentioned means comprising a slide mounted for reciprocation relative to the base for movement in a path generally parallel to the path of reciprocation of the carriage, means for reciprocating the slide means yieldably interconnecting the slide and carriage for movement in unison on the base and for continuing movement of the slide in the advancing direction after the carriage has reached said fixed advanced position, a cam track extending generally parallel to the path of travel of the slide and generally coextensive in length with the stroke of the slide, a cam follower on the slide operatively connected with the lift arm assembly and engaging the cam track for actuating the lift arm assembly as the cam follower traverses the cam track and means responsive to continued movement of the slide in the advancing direction after the carriage has reached said fixed advanced position for retracting the carriage toward said retracted position whereby the lift arm assembly is retracted to a position out of line with the second hooked supporting device to enable said last mentioned hooked supporting device to be moved past the lift arm assembly while the slide is in the advanced position in its stroke.

10. The combination set forth in claim 9 wherein said lift arm assembly is actuated to move upwardly to lift the work rack from one of the hooked supporting devices and downwardly to deposit the work rack on the other hooked supporting device and wherein the cam track has an operative portion located to be engaged by the cam follower after the carriage has reached said advanced position to shift the lift arm assembly and thereby deposit the work rack on the other hooked supporting device while the carriage is fixedly positioned in said advanced position.

11. The combination set forth in claim 10 wherein said means interconnecting the carriage and the slide comprises a resilient connection which biases the slide in the retracting direction relative to the carriage.

12. The combination set forth in claim 10 including an upright column mounted at the forward end of the carriage, said lift arm assembly being pivotally mounted on said column on a generally horizontal axis which extends transversely of the path of travel of the carriage, said lift arm assembly projecting generally forwardly of the column.

13. The combination set forth in claim 10 wherein said means for reciprocating the slide comprises a hydraulic piston-cylinder assembly connected between the base and the slide, said means interconnecting the carriage and the slide comprising a second hydraulic piston-cylinder assembly acting between the carriage and the slide, the first mentioned piston-cylinder assembly being adapted to overcome the influence of the second mentioned piston-cylinder assembly.

14. In a work transfer device, the combination of a first and a second member mounted for reciprocation along parallel paths, means for reciprocating the first member through a predetermined stroke, means for limiting the stroke of the second member in at least one direction to a distance less than the stroke of the first member in the same direction, means yieldably connecting the second member to move in unison with and in the same direction as the first member and means operative in response to continued movement of the first member in said one direction after the second member has reached the end of its stroke in said direction for retracting the second member in the opposite direction.

15. The combination set forth in claim 14 wherein the means for reciprocating the first member is capable of overcoming the bias of said yieldable connecting means.

16. The combination set forth in claim 14 including means on the second member for engaging and supporting a work rack and means for actuating said work rack engaging means to pick up a work rack adjacent said opposite end of the stroke of the second member and to deposit the work rack adjacent said one end of the stroke of the second member.

17. The combination set forth in claim 16 wherein said last mentioned means are operatively associated with and responsive to movement of the first member.

18. The combination set forth in claim 16 wherein said last mentioned means comprise a stationary cam track and a cam follower on the first member engaging said cam track, said cam track having an operative portion for causing the work rack engaging means to deposit the work rack as the second member approaches the end of its stroke in said one direction.

19. In a device for transferring a work rack from one hooked supporting device to another hooked supporting device spaced from the first, the combination comprising a base extending generally between said hooked supporting devices, guide means on said base, a carriage engaging with said guide means and reciprocable on said base between said supporting devices, said carriage having a lift arm assembly supported thereon for pivotal movement about a horizontal axis extending transversely of the path of travel of the carriage, a slide mounted on the carriage for movement in a path generally parallel to the path of travel of the carriage, a cam track on the base extending parallel to the path of movement of the slide and generally coextensive in length therewith, a cam follower engaged with said cam track and mounted on said slide for vertical movement thereon, a lever on said carriage having one end operatively connected with said lift arm assembly and the other end operatively connected to said cam follower, said cam follower being connected with said last mentioned end of said lever for relative movement therebetween in a direction parallel to the path of travel of the slide, means for limiting the movement of the carriage in one direction to a predetermined position, means for continuing movement of the slide in said one direction when the carriage reaches said predetermined position including means yieldably connecting the carriage and slide and tending to move the carriage with the slide, means for reciprocating said slide, said cam track being designed to actuate the lift arm assembly to deposit a supported work rack adjacent the end of the stroke of the carriage in said one direction and means responsive to said continued movement of the slide for retracting the carriage from said predetermined position.

References Cited in the file of this patent

UNITED STATES PATENTS

| 2,642,006 | Merritt et al. | June 16, 1953 |
| 2,806,577 | Lang | Sept. 17, 1957 |
| 2,807,349 | Hauk et al. | Sept. 24, 1957 |
| 2,840,219 | Mervyn et al. | June 24, 1958 |
| 2,883,031 | McCurdy | Apr. 21, 1959 |